(12) United States Patent
Yoshimura

(10) Patent No.: US 6,941,347 B2
(45) Date of Patent: Sep. 6, 2005

(54) NETWORK ADMINISTRATION SYSTEM AND METHOD OF RE-ARRANGING NETWORK RESOURCES

(75) Inventor: Yozo Yoshimura, Tokyo (JP)

(73) Assignee: NEC Corporation, Tokyo (JP)

( * ) Notice: Subject to any disclaimer, the term of this patent is extended or adjusted under 35 U.S.C. 154(b) by 751 days.

(21) Appl. No.: 09/865,510

(22) Filed: May 29, 2001

(65) Prior Publication Data

US 2001/0047416 A1 Nov. 29, 2001

(30) Foreign Application Priority Data

May 26, 2000 (JP) ........................................ 2000-155756

(51) Int. Cl.[7] .............................................. G06F 13/00
(52) U.S. Cl. ...................................... 709/206; 709/224
(58) Field of Search ................................. 709/223, 224, 709/226, 244; 714/4, 25, 31; 445/8, 9, 452.1–452.2, 435.2, 446

(56) References Cited

U.S. PATENT DOCUMENTS

| 5,442,682 | A | * | 8/1995 | Svedin et al. ............ 455/435.2 |
| 5,699,403 | A | * | 12/1997 | Ronnen ........................ 714/25 |
| 5,754,958 | A | * | 5/1998 | Tsuji et al. .................. 455/436 |
| 5,991,629 | A | * | 11/1999 | Agrawal et al. ............ 455/446 |
| 6,598,184 | B1 | * | 7/2003 | Merget et al. ................ 714/47 |
| 6,694,455 | B1 | * | 2/2004 | Scrandis et al. .............. 714/31 |
| 6,735,548 | B1 | * | 5/2004 | Huang et al. ............... 709/223 |

FOREIGN PATENT DOCUMENTS

| JP | 8-223634 | 8/1996 |
| JP | 8-256120 | 10/1996 |
| JP | 8-317458 | 11/1996 |
| JP | 10-107918 | 4/1998 |
| JP | 11-150754 | 6/1999 |
| JP | 11-186953 | 7/1999 |
| JP | 2986998 | 10/1999 |

* cited by examiner

Primary Examiner—Moustafa M. Meky
(74) Attorney, Agent, or Firm—Foley & Lardner LLP

(57) ABSTRACT

A network administration system includes a network administrator which performs re-arrangement of network resources. The network administrator includes functions of estimating a probability at which failures would occur in a cell in which network resources have been re-arranged, and repeating rearrangement of network resources for minimizing the probability, calculating a probability at which failures would occur, based on data about past cells, and indicating a probability at which failures would occur in each of cells in which network resources have been re-arranged.

22 Claims, 5 Drawing Sheets

NETWORK ADMINISTRATION SYSTEM AND METHOD OF RE-ARRANGING NETWORK RESOURCES

BACKGROUND OF THE INVENTION

1. Field of the Invention

The invention relates to network administration, and more particularly to a network administration system and a method of reducing a failure probability in components constituting a mobile communication network, by re-arranging network resources.

2. Description of the Related Art

In these days, there is a remarkable need for mobile communication. Since data communication service had been commenced, traffic in a network is increasing and increasing. With such increase in traffic, it becomes more and more difficult for a network administrator to properly administrate a network in comparison with an existing fixed network.

A network administrator usually estimates an increase in traffic, based on everyday data and his/her experience. A network administrator further identifies a cell site to which traffic is concentrated, and arrange maintenance personnel and optimize communication lines, based on his/her experience. Hence, it is quite difficult to estimate failures in a component or components constituting a cell cite to which traffic is concentrated, and resultingly, a network administrator deals with a failure when it actually occurs.

As a system for detecting a failure in such component or components, there have been suggested a system in which a mobile communication network makes an alarm when a failure occurs, a system in which traffic data is monitored for predetermined period of time to thereby estimate a failure in a mobile communication network, and an expert system in which artificial intelligence is used for diagnosing a component or components constituting a cell cite.

In the expert system, functions of components constituting a cell site are input into artificial intelligence so that the artificial intelligence studies a solution to repair the components when they go out of order. Such a solution as well as a component in failure is informed to a network administrator.

The above-mentioned systems provide merely solutions to failures which occurred in a mobile communication network. Hence, in accordance with the systems, even if a network administrator can estimate that a failure will occur in a certain component in a mobile communication network because of traffic concentration, based on his/her experiences, he/she cannot do anything to such a failure until it does actually occur.

In addition, the expert system is accompanied with problems that it takes much time to input functions of components into artificial intelligence, and that an accuracy with which causes of a failure are detected is deteriorated in dependence on what artificial intelligence studies.

Japanese Unexamined Patent Publication No. 8-256120 has suggested a method of detecting a failure in a mobile communication system including a base station which makes radio signal communication with mobile terminals, and a monitor station which makes communication with the base station through an exchange station, including the steps of collecting data a call processing alarm made in radio communication between the mobile terminal and the base station, at the monitor station through the exchange station, retrieving the collected call processing alarm, comparing the number of call processing alarms collected in a certain period of time, to a threshold value, and judging, when the number exceeds the threshold value, that a failure occurs at a site from which the call processing alarm is transmitted.

Japanese Unexamined Patent Publication No. 11-186953 has suggested a method of monitoring a frequency in mobile communication systems sharing the same frequency bands. In the method, a base station increases a zone to be monitored by the base station, based on frequency data detected by a mobile terminal registered in the base station. A supervisor base station monitors a frequency resource in the mobile communication system at real-time, based on both frequency resource data provided by the base station and the frequency data provided by the mobile terminal.

Japanese Unexamined Patent Publication No. 11-150754 has suggested a method of reducing a difference in quality of communication made between base stations which difference is caused by non-uniformity in traffic.

Japanese Unexamined Patent Publication No. 10-107918 has suggested a method of connecting a mobile communication terminal to a network to which a plurality of data processors, network devices and access points are connected. In the method, the mobile communication terminal stores therein data about whether the mobile communication terminal can be connected to an access point, and about status of connection. The mobile communication terminal transmits the data to a data processor which administrates the network, each time the mobile communication terminal is connected to the network. The data processor stores data transmitted from the mobile communication terminals, and transmits tabulation of the data to a mobile communication terminal when the mobile communication terminal is connected to the network. A user of a mobile communication terminal selects an access point, based on the tabulation of the data, and connects his/her mobile communication terminal to the network through the thus selected access point.

Japanese Patent Publication No. 2986998 has suggested a method of varying a communication zone in a mobile communication network including a plurality of radio signal base stations, a mobile station which makes radio signal communication with one of the radio signal base stations, and a base station controller which controls the base stations. In the method, the base station controller determines whether each of the base stations operates or not, based on traffic in a communication zone covered by each of the radio signal base stations. The base station controller further determines a size of a communication zone to be covered by a radio signal base station which was determined to operate, in dependence on operation of the rest of the radio signal base stations.

SUMMARY OF THE INVENTION

In view of the above-mentioned problems in the prior art, it is an object of the present invention to provide a network administration system which is capable of performing optimal re-arrangement of network resources to thereby make it possible to repair a failure immediately when it occurs.

It is also an object of the present invention to provide a method of re-arranging network resources in a network administration system, which method is capable of doing the same.

In one aspect of the present invention, there is provided a network administration system including a network administrator which performs re-arrangement of network resources, the network administrator including functions of (a) estimating a probability at which failures would occur in a cell in which network resources have been re-arranged, and (b) repeating re-arrangement of network resources for minimizing the probability.

The network administrator may further include a function of calculating a probability at which failures would occur based on data about past cells.

The network administrator may further include a function of indicating a probability at which failures would occur in each of cells in which network resources have been re-arranged.

The network administration system may further include a first database storing MTBF data indicative of mean time between failures (MTBF) of components constituting a mobile communication system, a second database storing failure data about past failures of components constituting a cell, and a third database storing cell site data indicative of past traffic.

The network administration system may further include a cell site which informs the network administrator of the cell site data in each of cells.

It is preferable that the network administrator further includes a function of calculating a probability at which failures would occur, based on the MTBF data, the failure data, and the cell site data.

The network administrator may further include a function of constructing and retrieving the first to third databases.

The network administrator may further include a function of checking the MTBF data, the failure data and the cell site data with one another, and calculating a probability at which failures would occur in the re-arranged mobile communication network, in each of cells.

In another aspect of the present invention, there is provided a method of re-arranging network resources in a network administration system, including the steps of (a) estimating a probability at which failures would occur in a cell in which network resources have been re-arranged, and (b) repeating re-arrangement of network resources for minimizing the probability.

The method may further include the step of calculating a probability at which failures would occur, based on data about past cells.

The method may further include the step of indicating a probability at which failures would occur in each of cells in which network resources have been re-arranged.

The method may further include a database storage step including the steps of storing MTBF data indicative of mean time between failures (MTBF) of components constituting the network administration system, storing failure data about past failures of components constituting a cell, in a second database, and storing cell site data indicative of past traffic in a third database.

The method may further include the step of transmitting the cell cite data in each of cells to a network administrator from a cell site.

The method may further include the step of calculating a probability at which failures would occur, based on the MTBF data, the failure data, and the cell site data.

The method may further include the step of constructing and retrieving the first to third databases.

The method may further include the steps of checking the MTBF data, the failure data and the cell site data with one another, and calculating a probability at which failures would occur in the re-arranged mobile communication network.

For instance, the database storage step further includes the steps of storing data indicative of mean time between failures of components constituting the mobile communication network, in the first database, accumulating the failure data in the second database for each of cells to thereby automatically register data past failures which occurred in each of cells, in the second database, and accumulating the cell site data in the third database for each of cells to thereby automatically register the cell site data in each of cells in the third database.

The method may further include a database processing step in which data about past cell for each of cells is administrated.

The method may further include the steps of retrieving data about past cells, and collecting data about past cells which data is similar to data about present cells.

The method may further include the steps of re-arranging network resources of a cell to which traffic is estimated to concentrate, and producing data about a target cell.

The method may further include the step of extracting data indicative of a frequency at which failures occurred, out of the data about past cells and the data about a target cell, and calculating a failure probability in accordance with the equation X/Y wherein X indicates data about past cells in which failures occurred, and Y indicates data about all past cells.

The method may further include the steps of displaying the failure probability as a failure probability of a cell in which network resources have been re-arranged, and informing a network administrator of the failure probability.

The method may further include the steps of judging whether rearrangement of network resources in a present cell, based on the failure probability, and repeating re-arrangement of the network resources, if the rearrangement of network resources in a present cell is not appropriate.

In still another aspect of the present invention, there is provided a recording medium readable by a computer, storing a program therein for causing a computer to act as the above-mentioned network administrator performing rearrangement of network resources in a network administration system.

The advantages obtained by the aforementioned present invention will be described hereinbelow.

The first advantage is that it is possible to objectively estimate rearrangement of network resources, based on past data, and hence, properly re-arrange network resources.

The second advantage is that, even if proper re-arrangement of network resources cannot be performed for some reasons, it would be possible to dispatch maintenance personnel to a cell site to which traffic is concentrated, ensuring that a component in failure would be immediately repaired.

The third advantage is that a network administrator could know a failure probability any time in each of cells in a mobile communication network, and hence, can operate the mobile communication network with high stability.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
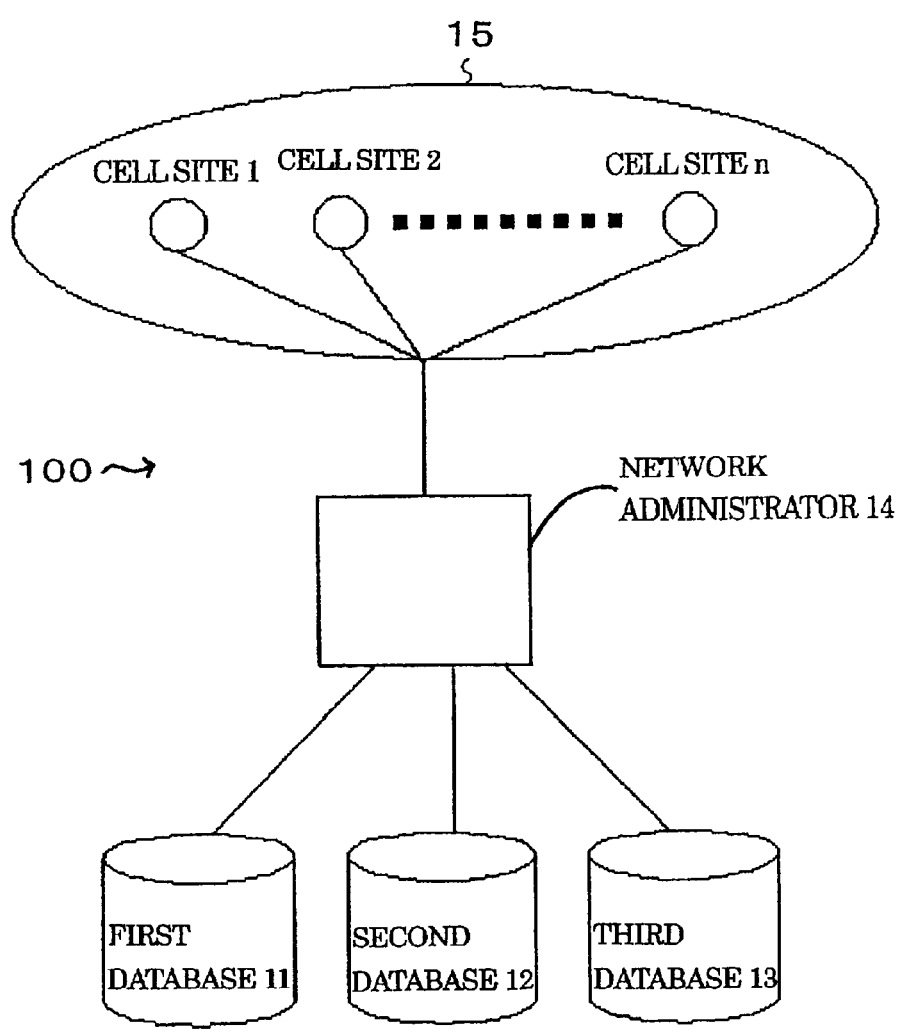
FIG. 1 is a functional block diagram of a network administration system in accordance with an embodiment of the present invention.

FIG. 1 is a functional block diagram of a network administration system 100 in accordance with an embodiment of the present invention.

As illustrated in FIG. 1, the network administration system 100 is comprised of a first database 11 storing data (hereinbelow, called "MTBF data") about mean time between failures (MTBF) of components constituting a mobile communication network 15, a second database 12 storing data (hereinbelow, called "past failure data") about past failures of components constituting each of cells, a third database 13 storing data (hereinbelow, called "cell site data") about past traffic in each of cells, a network administrator 14 which calculates a failure probability, based on the MTBF data, past failure data and cell site data and first to n-th cell sites 1 to n each of which transmits traffic data for each of cells to the network administrator 14.

The network administrator 14 includes functions of producing and retrieving the first to third databases 11 to 13, and checking the MTBF data, past failure data and cell site data with one another to thereby calculate a failure probability in each of cells in the mobile communication network 15 in which network resources have been re-arranged.

Figure 2:
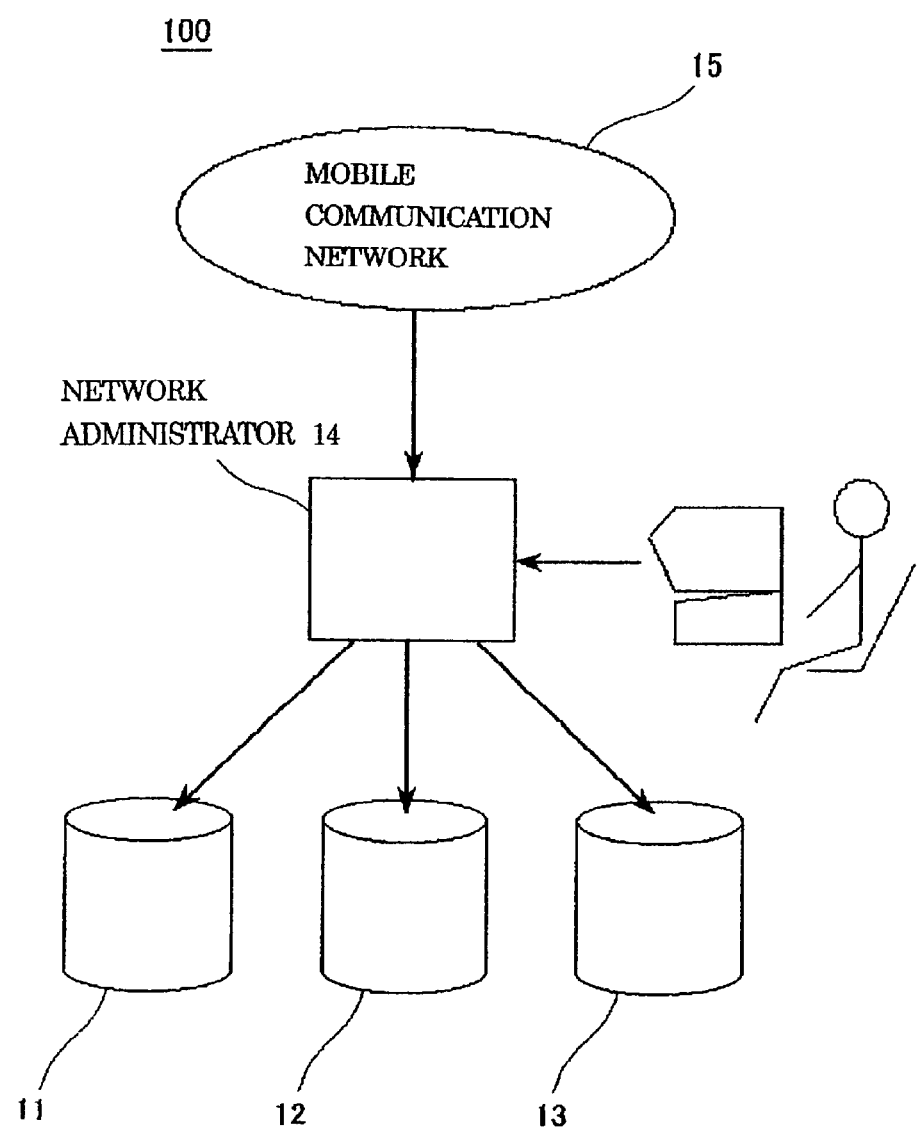
FIG. 2 is a functional block diagram of the network administration system illustrated in FIG. 1.

FIG. 2 is a functional block diagram of the network administration system 100. Hereinbelow is explained an operation of the network administration system 100 with reference to FIG. 2.

First, a step of registering data into a database is explained.

With reference to FIG. 2, MTBF data of components constituting the network communication network 15 is registered into the first database 11 for each of cells. MTBF data is manually updated by an operator of the network administrator 14 when a base station is built or repaired.

Data about past failures in each of cells is automatically registered into the second database 12. Specifically, data about failures transmitted to the network administrator 14 from the mobile communication network 15 as an alarm is accumulated in the second database 12 for each of cells.

Data about past traffic in each of cells is automatically registered into the third database 13. Specifically, data about past traffic transmitted to the network administrator 14 from the mobile communication network 15 is accumulated in the third database 13 for each of cells.

Hereinbelow is explained re-arrangement of network resources in the network administration system 100.

Figure 3:
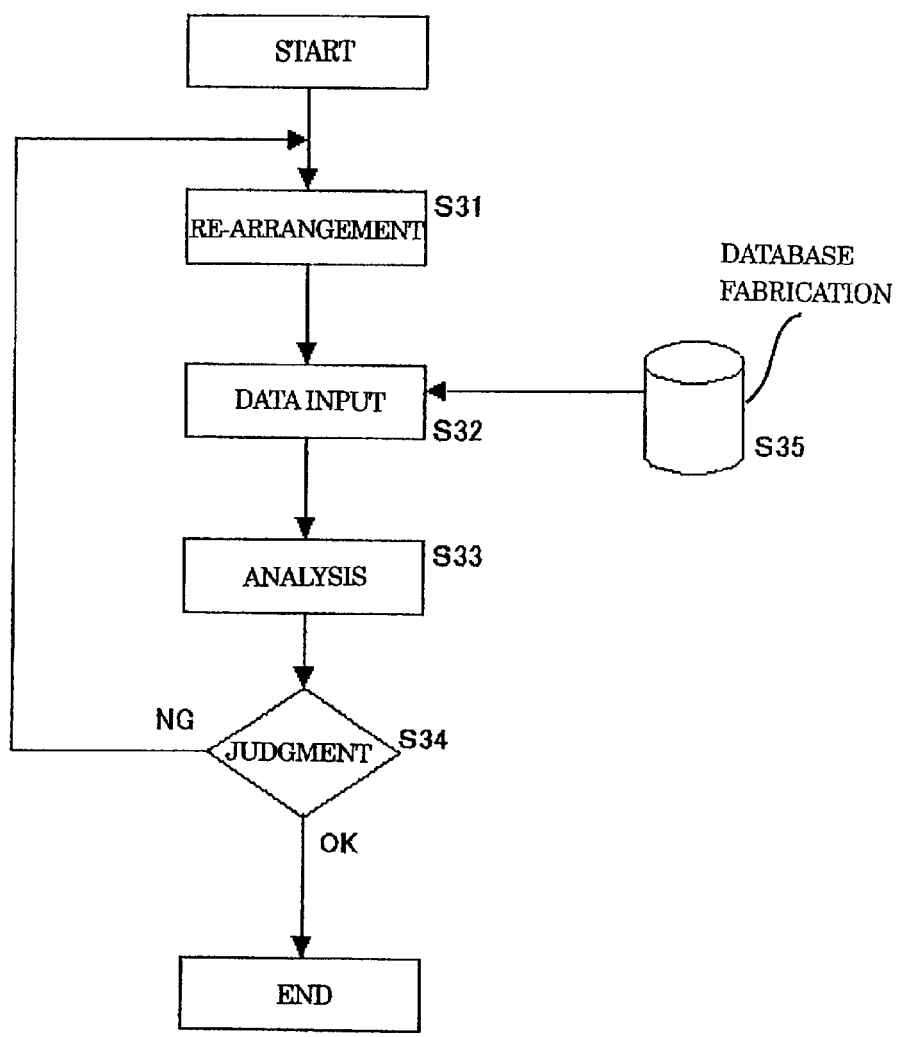
FIG. 3 is a flow chart showing steps of a method of re-arranging network resources, in accordance with an embodiment of the present invention.

FIG. 3 is a flow chart showing steps for an administrator of the network administration system 100 to re-arrange network resources in a cell to which traffic is concentrated.

With reference to FIG. 3, an administrator of the network administration system 100 re-arranges network resources in a cell to which traffic is expected to concentrate, through the network administrator 14, in step S31.

Then, the network administrator 14 produces data about present status of a target cell, and transmits the thus produced data to a program which inputs data into a database, in step S32.

Then, the network administrator 14 retrieves a database fabricated in step S35 to collect data about past cells together with data about present cells.

The thus obtained data about past and present cells is transmitted to an analysis program which will carry out step S33.

In step S33, the network administrator 14 extracts data indicative of a frequency at which failures occurred, out of data about past cells, and then, calculates a failure probability F in accordance with the following equation.

$$F = X/Y$$

In the equation, X indicates data about past cells in which failures occurred, and Y indicates data about all past cells.

The thus calculated probability F is displayed in a screen in the network administrator 14 as a failure probability of a cell in which network resources have been re-arranged, and is informed to an administrator of the network administration system 100 who had performed re-arrangement of network resources in step S31.

In step S34, an administrator of the network administration system 100 looks at the failure probability F displayed in a screen of the network administrator 14, and judges whether a re-arrangement of network resources in a present cell, which re-arrangement was estimated in step S31, is proper or not.

If the re-arrangement is not proper (NG in step S34), the abovementioned steps S31 to S34 are repeatedly carried out.

If the re-arrangement is proper (OK in step S34), the re-arrangement of network resources is finished.

Figure 4:
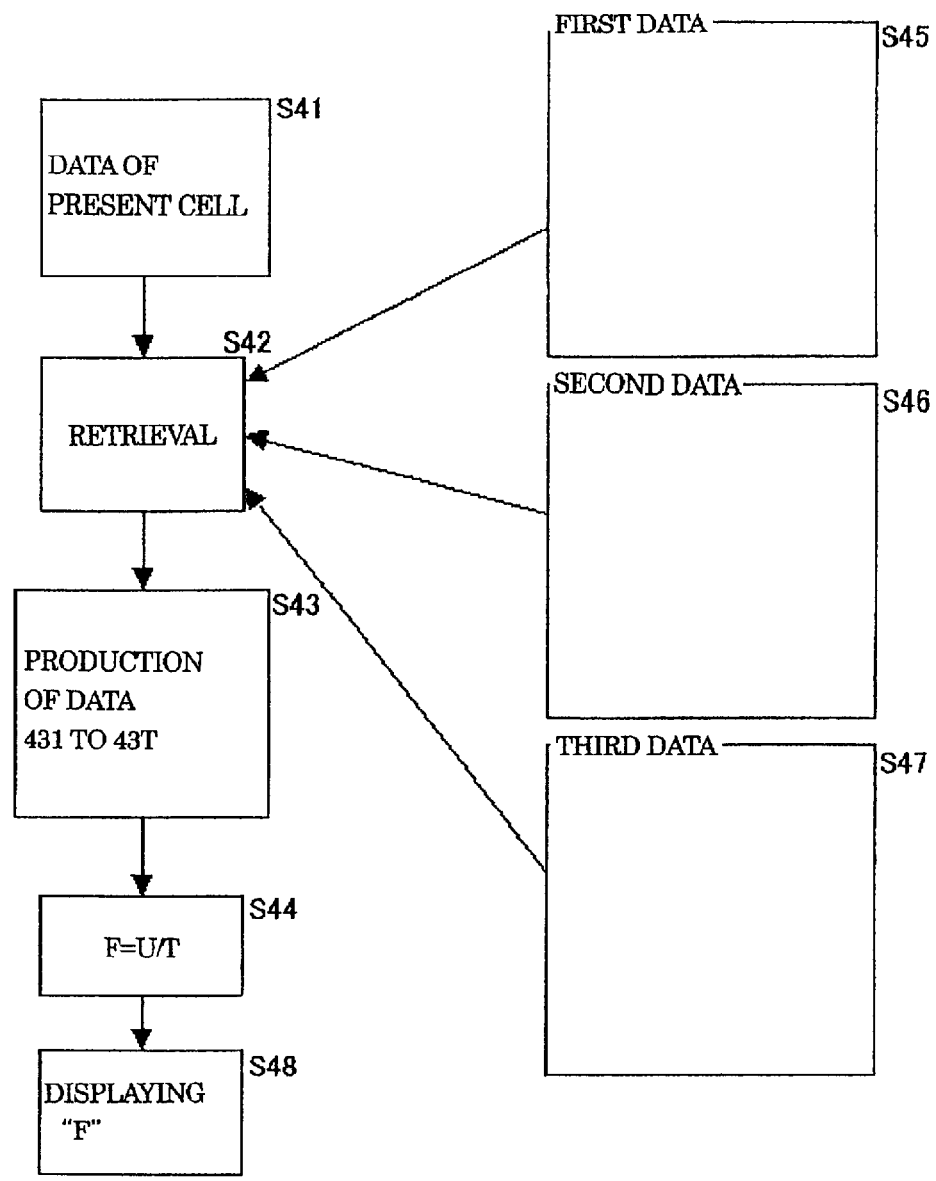
FIG. 4 is a flow chart showing a step of calculating a failure probability in a network administrator.

FIG. 4 is a flow chart showing steps of calculating a failure probability in the network administrator 14. Hereinbelow is explained a method of calculating a failure probability.

With reference to FIG. 4, data indicative of present status of a cell, used in step S41, is automatically produced by the network administrator 14 when an administrator of the network administration system 100 re-arranges network resources. The data indicative of present status of a cell includes data about components constituting a cell, cell identifiers A to N inherent to the mobile communication network 15, and estimated traffic.

In step S45, first data is stored into the first database 11. The first data is comprised of data about components constituting the network administration system 100 and date at which the network administration system 100 is constituted of the components, associated with each of the cell identifiers A to L.

In step S46, second data is stored into the second database 12. The second data is comprised of date at which a failure occurred and data about the failure, associated with each of the cell identifiers A to M.

In step S47, third data is stored into the third database 13. The third data is comprised of date at which traffic was recorded and data about the traffic, associated with each of the cell identifiers A to N.

In step S42, the network administrator 14 retrieves the first database 11 to collect data coincident with a keyword, based on both the data about present status of a cell transmitted from step S33 and the first data transmitted from step S45. The network administrator 14 further retrieves the second database 12 to collect data coincident with a keyword, based on both the data about present status of a cell transmitted from step S33 and the second data transmitted from step S46. The network administrator 14 still further retrieves the third database 13 to collect data coincident with a keyword, based on both the data about present status of a cell transmitted from step S33 and the third data transmitted from step S47.

In step S43, the network administrator 14 produces and outputs data 431 to 43T about past cells, based on the data collected in step S42.

In step S44, the network administrator 14 determines the number U of data about past cells in which a failure beyond a threshold level occurred, among the data 431 to 43T. Then, the network administrator 14 calculates a failure probability F in accordance with the following equation.

$$F=U/T$$

In the equation, T indicates the number of data about past cells, produced in step S43.

Then, the thus calculated failure probability F is displayed in a screen of the network administrator 14.

The above-mentioned steps S42 to S44 are repeatedly carried out to thereby minimize the failure probability F, and optimize arrangement of network resources.

In a mobile communication system, a subscriber moves here and there together with his/her terminal device. Hence, traffic is concentrated to different cells with the lapse of time in the mobile communication network 15. Thus, since it was quite difficult to estimate where users make a call from their terminal devices and/or how many times users make a call, it was almost impossible to properly re-arrange network resources to a cell to which traffic is concentrated.

In contrast, the network administration system 100 in accordance with the embodiment makes it possible to objectively estimate re-arrangement of network resources, based on past data, ensuring optimal re-arrangement of network resources.

In addition, even if proper re-arrangement of network resources cannot be performed, it would be possible to dispatch maintenance personnel to a cell site to which traffic is concentrated, ensuring that a component in failure would be immediately repaired.

In accordance with the network administration system 100, the failure probability F in each of cells is displayed in a screen of the network administrator 14. Hence, an administrator of the network administration system 100 can know the failure probability any time in each of cells, and hence, can optimally operate the mobile communication network.

The control for the network administrator 14 may be accomplished as a program including various commands, and be presented through a recording medium readable by a computer.

Figure 5:
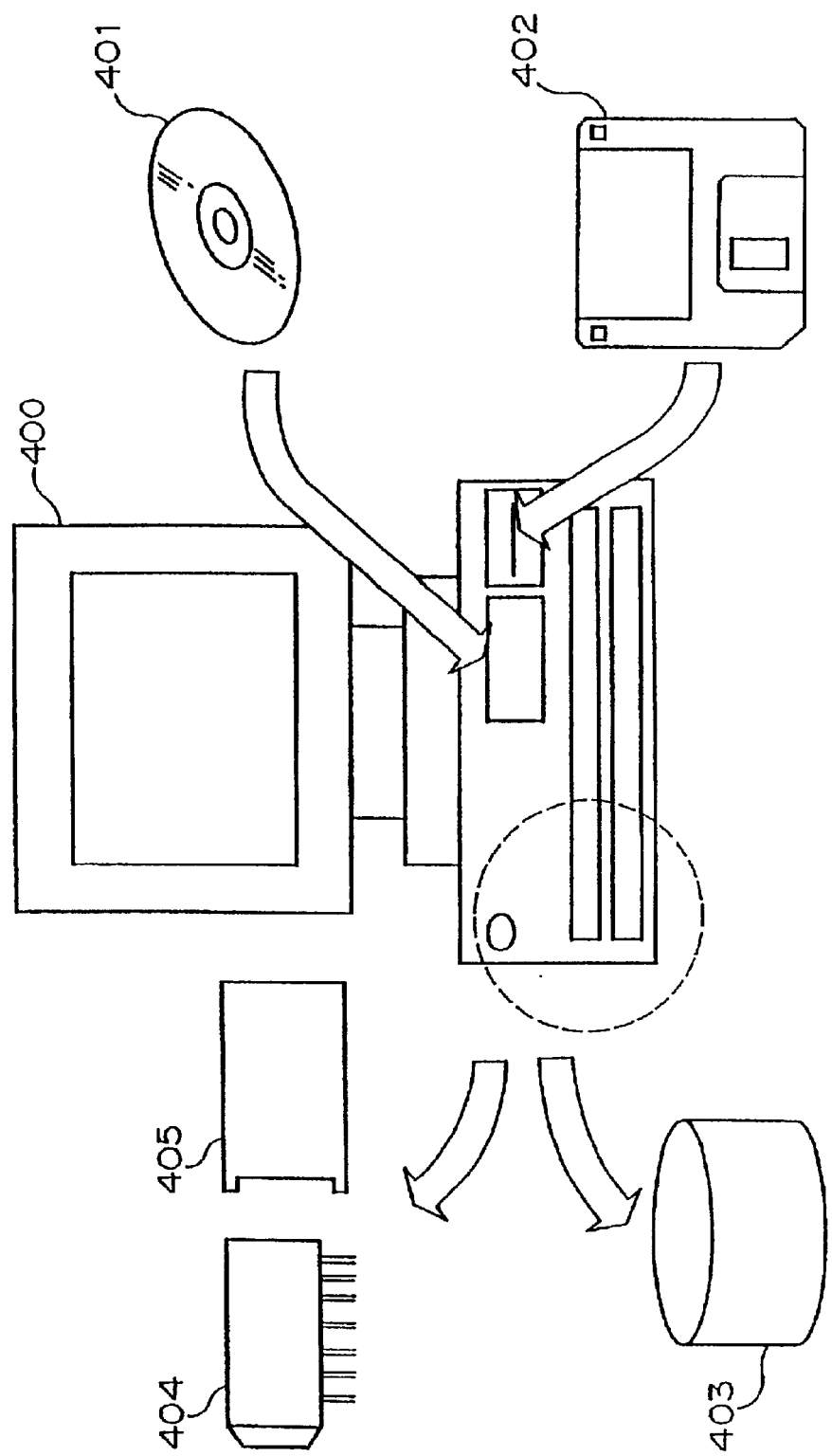
FIG. 5 illustrates examples of recording mediums in which a program for operating a network administrator is to be stored.

In the specification, the term "recording medium" means any medium which can record data therein. Examples of a recording medium are illustrated in FIG. 5.

The term "recording medium" includes, for instance, a disk-shaped recorder 401 such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk 402, a memory chip 404 such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM 405 such as a compact flush card, a hard disk 403, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network As a computer 400, there may be used a personal computer, a desk-top type computer, a note-book type computer, a mobile computer, a lap-top type computer, a pocket computer, a server computer, a client computer, a workstation, a host computer, a commercially available computer, and electronic exchanger, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-155756 filed on May 26, 2000 including specification, claims, drawings and summary is incorporated herein by reference in its entirety.

What is claimed is:

1. A network administration system comprising a network administrator which performs re-arrangement of network resources, said network administrator including functions of:
(a) estimating a probability at which failures would occur in a cell in which network resources have been re-arranged; and
(b) repeating re-arrangement of network resources for minimizing said probability; and said network administration system further comprising:
a first database storing MTBF data indicative of mean time between failures (MTBF) of components constituting a mobile communication system;
a second database storing failure data about past failures of components constituting a cell; and
a third database storing cell site data indicative of past traffic.

2. The network administration system as set forth in claim 1, further comprising a cell site which informs said network administrator of said cell site data in each of cells.

3. The network administration system as set forth in claim 2, wherein said network administrator further includes a function of calculating a probability at which failures would occur, based on said MTBF data, said failure data, and said cell site data.

4. The network administration system as set forth in claim 3, wherein said network administrator further includes a function of constructing and retrieving said first to third databases.

5. The network administration system as set forth in claim 4, wherein said network administrator further includes a function of checking said MTBF data, said failure data and said cell site data with one another, and calculating a probability at which failures would occur in the re-arranged mobile communication network, in each of cells.

6. A method of re-arranging network resources in a network administration system, comprising the steps of:
(a) estimating a probability at which failures would occur in a cell in which network resources have been re-arranged; and
(b) repeating re-arrangement of network resources for minimizing said probability,
said method further comprising a database storage step including the steps of:
storing MTBF data indicative of mean time between failures (MTBF) of components constituting said network administration system;
storing failure data about past failures of components constituting a cell, in a second database; and
storing cell site data indicative of past traffic in a third database.

7. The method as set forth in claim 6, further comprising the step of transmitting said cell cite data in each of cells to a network administrator from a cell site.

8. The method as set forth in claim 7, further comprising the step of calculating a probability at which failures would occur, based on said MTBF data, said failure data, and said cell site data.

9. The method as set forth in claim 8, further comprising the step of constructing and retrieving said first to third databases.

10. The method as set forth in claim 9, further comprising the steps of checking said MTBF data, said failure data and said cell site data with one another, and calculating a probability at which failures would occur in the rearranged mobile communication network.

11. The method as set forth in claim 6, wherein said database storage step further includes the steps of:
storing data indicative of mean time between failures of components constituting said mobile communication network, in said first database;
accumulating said failure data in said second database for each of cells to thereby automatically register data past failures which occurred in each of cells, in said second database; and
accumulating said cell site data in said third database for each of cells to thereby automatically register said cell site data in each of cells in said third database.

12. A method of re-arranging network resources in a network administration system, comprising the steps of:
(a) estimating a probability at which failures would occur in a cell in which network resources have been re-arranged; and
(b) repeating re-arrangement of network resources for minimizing said probability;
said method further comprising a database storage step including the steps of:
storing MTBF data indicative of mean time between failures (MTBF) of components constituting said network administration system;
storing failure data about past failures of components constituting a cell, in a second database; and
storing cell site data indicative of past traffic in a third database
said method further comprising a database processing step in which data about past cell for each of cells is administrated.

13. The method as set forth in claim 12, further comprising the steps of retrieving data about past cells, and collecting data about past cells which data is similar to data about present cells.

14. The method as set forth in claim 13, further comprising the steps of rearranging network resources of a cell to which traffic is estimated to concentrate, and producing data about a target cell.

15. The method as set forth in claim 14, further comprising the step of extracting data indicative of a frequency at which failures occurred, out of said data about past cells and said data about a target cell, and calculating a failure probability in accordance with the equation X/Y wherein X indicates data about past cells in which failures occurred, and Y indicates data about all past cells.

16. The method as set forth in claim 15, further comprising the steps of displaying said failure probability as a failure probability of a cell in which network resources have been re-arranged, and informing a network administrator of said failure probability.

17. The method as set forth in claim 16, further comprising the steps of:
judging whether re-arrangement of network resources in a present cell, based on said failure probability; and
repeating re-arrangement of said network resources, if said re-arrangement of network resources in a present cell is not appropriate.

18. A recording medium readable by a computer, storing a program therein for causing a computer to act as a network administrator performing rearrangement of network resources in a network administration system, said network administrator including functions of:
(a) estimating a probability at which failures would occur in a cell in which network resources have been re-arranged; and
(b) repeating re-arrangement of network resources for minimizing said probability
wherein said network administration system further includes:
a first database storing MTBF data indicative of mean time between failures (MTBF) of components constituting a mobile communication system;
a second database storing failure data about past failures of components constituting a cell; and
a third database storing cell site data indicative of past traffic.

19. The recording medium as set forth in claim 18, wherein said network administration system further includes a cell site which informs said network administrator of said cell site data in each of cells.

20. The recording medium as set forth in claim 19, wherein said network administrator further includes a function of calculating a probability at which failures would occur, based on said MTBF data, said failure data, and said cell site data.

21. The recording medium as set forth in claim 20, wherein said network administrator further includes a function of constructing and retrieving said first to third databases.

22. The recording medium as set forth in claim 21, wherein said network administrator further includes a function of checking said MTBF data, said failure data and said cell site data with one another, and calculating a probability at which failures would occur in the re-arranged mobile communication network, in each of cells.

* * * * *